(12) United States Patent
Ansari et al.

(10) Patent No.: US 7,624,209 B1
(45) Date of Patent: Nov. 24, 2009

(54) METHOD OF AND CIRCUIT FOR ENABLING VARIABLE LATENCY DATA TRANSFERS

(75) Inventors: Ahmad R. Ansari, San Jose, CA (US); Mehul R. Vashi, San Jose, CA (US); Alex Scott Warshofsky, Santa Clara, CA (US)

(73) Assignee: XILINX, Inc., San Jose, CA (US)

( * ) Notice: Subject to any disclaimer, the term of this patent is extended or adjusted under 35 U.S.C. 154(b) by 468 days.

(21) Appl. No.: 10/941,240

(22) Filed: Sep. 15, 2004

(51) Int. Cl.
*G06F 5/06* (2006.01)
*G06F 13/00* (2006.01)
(52) U.S. Cl. ........................ 710/58; 711/167
(58) Field of Classification Search ............... 710/58; 711/167
See application file for complete search history.

(56) References Cited

U.S. PATENT DOCUMENTS

| | | | | |
|---|---|---|---|---|
| 5,537,660 A * | 7/1996 | Bond et al. | ............. | 710/58 |
| 5,737,637 A * | 4/1998 | Toda et al. | ............. | 710/58 |
| 5,966,343 A * | 10/1999 | Thurston | ............. | 365/233.1 |
| 6,105,083 A * | 8/2000 | Kurtze et al. | ............. | 710/29 |
| 6,185,664 B1 * | 2/2001 | Jeddeloh | ............. | 711/167 |
| 6,247,084 B1 * | 6/2001 | Apostol et al. | ............. | 710/108 |
| 6,522,167 B1 | 2/2003 | Ansari et al. | | |
| 6,662,285 B1 | 12/2003 | Douglass et al. | | |
| 6,804,197 B1 * | 10/2004 | Henry et al. | ............. | 370/230.1 |
| 7,353,484 B1 * | 4/2008 | Pritchard et al. | ............. | 716/16 |
| 2002/0062408 A1 * | 5/2002 | Jahnke et al. | ............. | 710/22 |
| 2002/0069375 A1 * | 6/2002 | Bowen | ............. | 713/400 |
| 2004/0268075 A1 * | 12/2004 | Qawami et al. | ............. | 711/167 |

\* cited by examiner

*Primary Examiner*—Henry W. H. Tsai
*Assistant Examiner*—Kris Rhu
(74) *Attorney, Agent, or Firm*—John J. King (57) ABSTRACT

A method of enabling variable latency data transfers in an electronic device, such as an FPGA with an embedded processor, is described. According to one aspect of the invention, a method comprises steps of providing an address for a data transfer between a memory controller and a peripheral device; coupling an address valid signal to the peripheral device; transferring the data between the memory controller and the peripheral device; and receiving a data transfer complete signal at the memory controller. According to another aspect of the invention, an integrated circuit enabling a variable latency data transfer is described. The integrated circuit comprises peripheral device; a memory controller coupled to the peripheral device; an address valid signal coupled from the memory controller to the peripheral device; and a transfer complete signal coupled from the peripheral device to the memory controller.

33 Claims, 9 Drawing Sheets

METHOD OF AND CIRCUIT FOR ENABLING VARIABLE LATENCY DATA TRANSFERS

FIELD OF THE INVENTION

The present invention relates generally to electronic circuits, and in particular, to a method of and circuit for enabling variable latency data transfers in electronic circuits.

BACKGROUND OF THE INVENTION

Programmable logic devices (PLDs) are a well-known type of integrated circuit that can be programmed to perform specified logic functions, and may function to interface with other integrated circuits or components of electronic devices. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, processors, clock managers, delay lock loops (DLLs), etc.

The programmable logic of a programmable logic device implements the logic of a user design using programmable elements that can include, for example, function generators, registers, arithmetic logic, etc. The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA. Another common programmable logic device is a complex programmable logic device (CPLD). For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

An On-Chip Memory (OCM) controller, which is also typically provided on an FPGA having a processor, serves as a dedicated interface between the BRAMs in the FPGA and OCM signals available on an embedded processor, such as a PowerPC™ processor available from IBM Corporation. The OCM signals are designed to provide quick access to a fixed amount of instruction and data memory space. The OCM controller, which typically comprises an instruction side on-chip memory (ISOCM) controller and a data side on-chip memory (DSOCM) controller, provides an interface to both an Instruction-Side Block RAM (ISBRAM) and a Data-Side Block RAM (DSBRAM). A designer of an FPGA can choose to implement any combination of ISBRAM and/or DSBRAM. A typical application for a DSOCM controller includes enabling a dual-port feature of BRAM to provide bi-directional data transfers between a processor and circuits of an FPGA.

Figure 1:
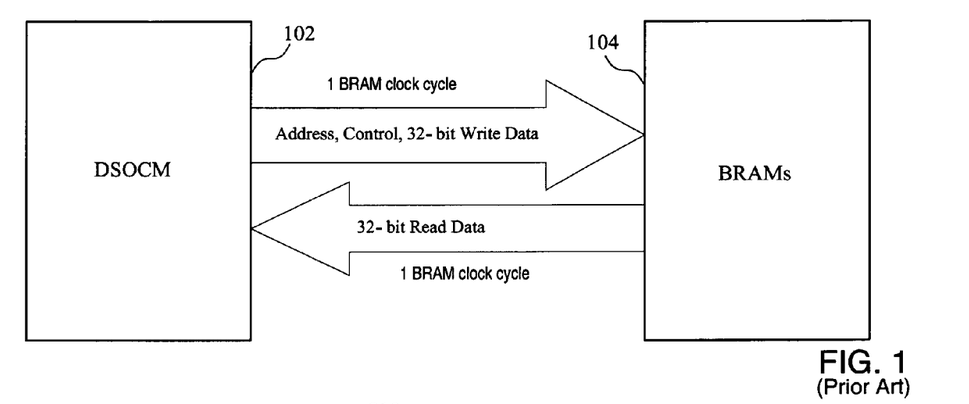
FIG. 1 is a block diagram of a conventional circuit for writing data to or reading data from a memory.

However, such conventional DSOCM controllers have a fixed latency of operation. That is, data is read from or written to a memory of the FPGA in a fixed number of BRAM clock cycles. A fixed latency approach guarantees that the data load and data store operations are completed in a predetermined, fixed number of BRAM clock cycles. This guarantees a deterministic performance between the DSOCM controller and on-chip BRAMs of an FPGA, for example. FIG. 1 comprises a conventional circuit for reading data from or writing data to a memory. As shown in FIG. 1, address information, control signals, and data to be written to a BRAM are provided to the BRAM in one BRAM clock cycle, while data read from the BRAM is returned in one BRAM clock cycle. Accordingly, a read operation for a BRAM employing a conventional DSOCM controller will require a predetermined number of clock cycles, namely two BRAM clock cycles.

In addition to controlling a BRAM, the DSOCM controller may also interface with other peripheral devices, including for example hardware circuits of the FPGA or external RAM. Depending upon the devices being controlled by the DSOCM controller, data may be sent to a device from the DSOCM controller or received by the DSOCM controller at different rates. However, because conventional DSOCM controllers only provide a fixed latency operation, these conventional DSOCM controllers will operate on a predetermined number of clock cycles which is dependent upon the slowest peripheral or operation being controlled by the DSOCM controller.

Accordingly, there is a need for a method of and circuit for enabling variable latency data transfers in electronic circuits, such as programmable logic devices, which allow different peripherals and on-chip memory to run at different speeds when they are attached to a DSOCM controller.

SUMMARY OF THE INVENTION

According to one aspect of the invention, a method comprises steps of providing an address for a data transfer between a memory controller and a peripheral device; coupling an address valid signal to the peripheral device; transferring the data between the memory controller and the peripheral device; and receiving a data transfer complete signal at the memory controller. According to other aspects of the invention, data is transferred after varying numbers of clock cycles depending upon the peripheral or operation being controlled by the DSOCM controller. Embodiments related to reading and writing to a memory such as a random access memory are also described.

According to another aspect of the invention, an integrated circuit enabling a variable latency data transfer is described. The integrated circuit comprises a peripheral device; a memory controller coupled to the peripheral device; an address valid signal coupled from the memory controller to the peripheral device; and a transfer complete signal coupled from the peripheral device to the memory controller. This aspect may further include an embedded processor coupled to the memory controller. Specific embodiments comprising address hold circuits and data hold circuits are also described.

DETAILED DESCRIPTION OF THE DRAWINGS

Figure 2:
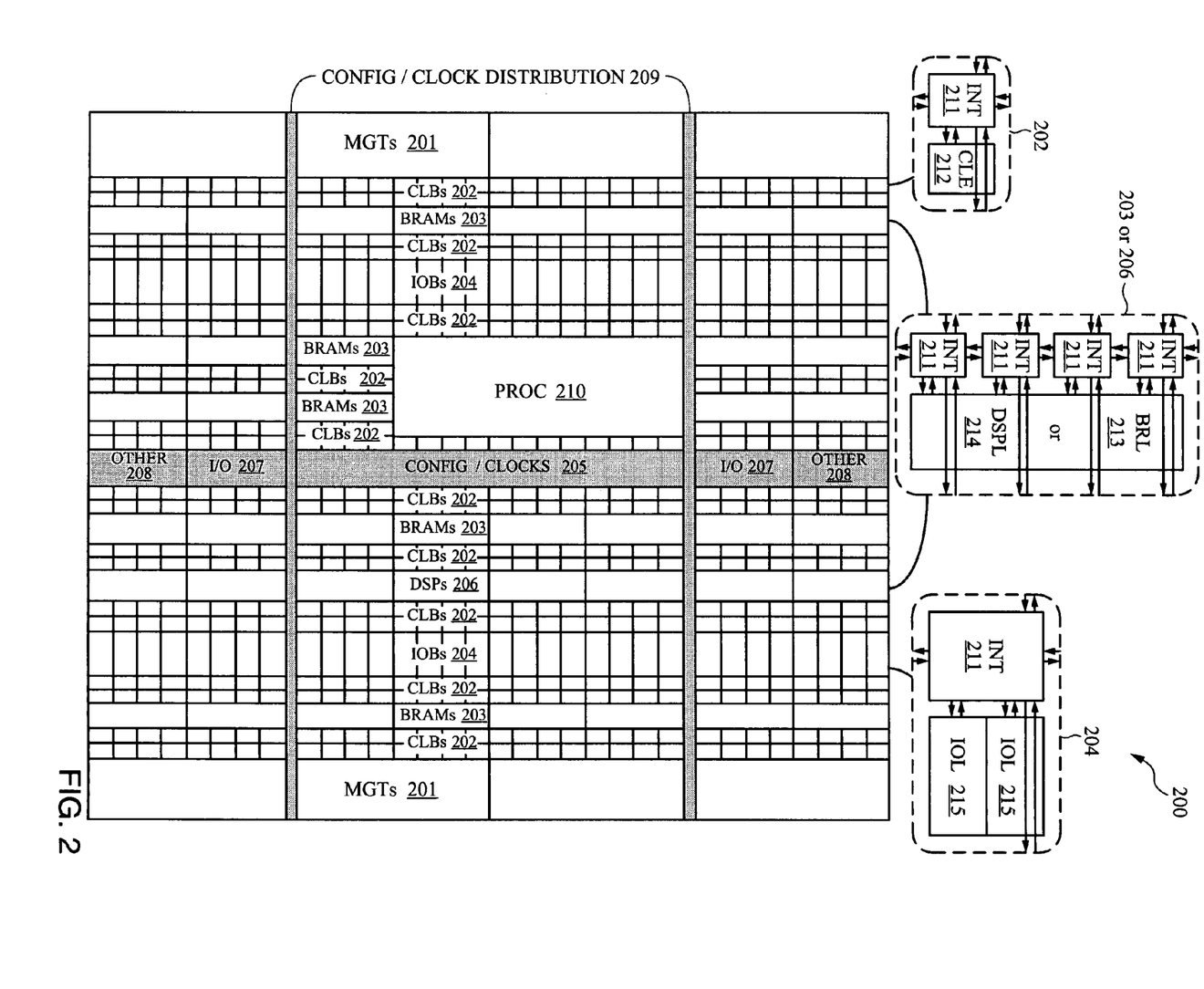
FIG. 2 is a block diagram of a circuit for implementing circuits and methods for enabling variable latency data transfers according to an embodiment of the present invention.

Turning first to FIG. 2, a block diagram of a circuit for implementing circuits and methods according to an embodiment of the present invention is shown. In particular, advanced FPGAs can include several different types of programmable logic blocks in the array. For example, FIG. 2 illustrates an FPGA architecture 200 that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include dedicated processor blocks (PROC 210).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 2.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA. Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs.

Note that FIG. 2 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 2 are purely exemplary. For example, in an actual FPGA more than one adjacent column of CLBs is typically included wherever the CLBs appear, to facilitate the efficient implementation of user logic.

Figure 3:
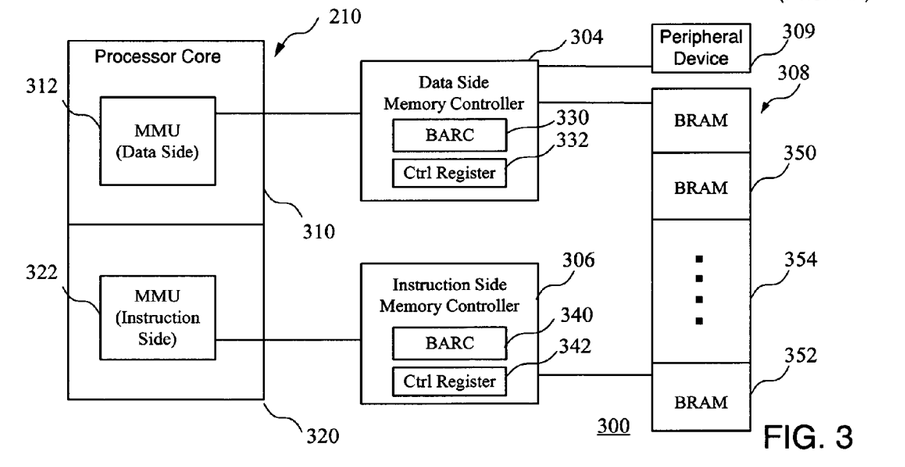
FIG. 3 is a block diagram of circuit having a DSOCM controller and an ISOCM controller according to an embodiment of the present invention.

Turning now to FIG. 3, a block diagram of circuit having a DSOCM controller and an ISOCM controller according to an embodiment of the present invention is shown. In a circuit for accessing a memory according to one embodiment of the present invention, a separate user configurable memory controller is preferably used for a data side and an instruction side. In particular, a processor 210 is coupled to a data side memory controller 304 and an instruction side memory controller 306, each of which interface with a memory, such as a block of BRAMs 308. The DSOCM controller is also coupled to a peripheral device 309, as will be described in more detail in reference to FIG. 4. A peripheral device could be any circuit or component of an integrated circuit (such as an FPGA) implementing the DSOCM controller, or a circuit or component separate from the integrated circuit which implements the DSOCM controller. Examples of peripheral devices include an internal BRAM, circuits implemented in the FPGA fabric, an external RAM, GPIO registers, displays, or any other device capable of reading or writing data on the integrated circuit or coupled to the integrated circuit.

The processor also preferably comprises a separate data side interface 310 and instruction side interface 320. Data side 310 preferably comprises a memory management unit 312, while instruction side 320 also comprises a memory management unit 322. The data side memory controller 304 contains a base address register 330 and a control register 332 while instruction side memory controller 306 contains a base address register 340 and a control register 342. Finally, BRAMs 308 comprise a portion 350 which may be used for data, another portion 352 which may be used for instructions, and a remaining portion 354 may be used for other purposes. Portions 350, 352, and 354 may have different address depths and memory sizes. The interaction of the DSOCM controller with a peripheral device will be described in more detail in reference to later figures.

Figure 4:
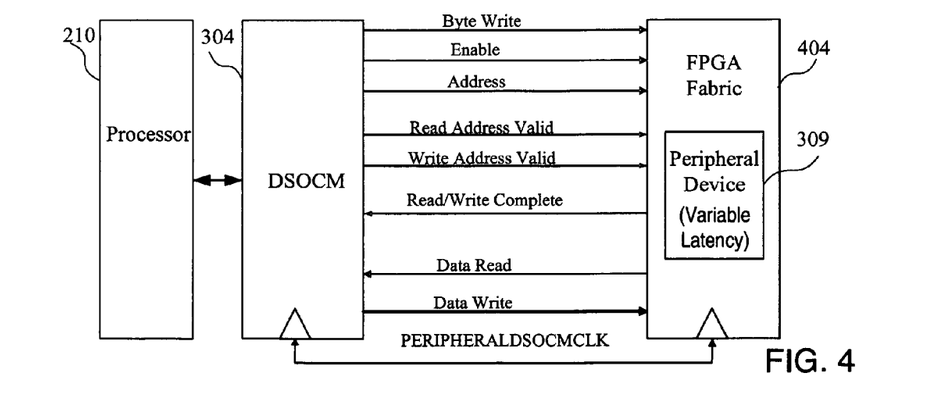
FIG. 4 is a block diagram showing the transfer of data and control signals between a DSOCM controller and a peripheral device enabling variable latency data transfers according to an embodiment of the present invention.

Turning now to FIG. 4, a block diagram shows the transfer of data and control signals between a DSOCM controller and a peripheral device enabling variable latency data transfers according to an embodiment of the present invention. In particular, a DSOCM controller 304 is coupled between processor 210 and the FPGA fabric 404. FPGA fabric 404 generally includes circuits for implementing a programmable logic device. The DSOCM controller 304 couples signals enabling writing data to and reading data from the peripheral device 309. In particular, an enable signal enables the peripheral device to receive data written to the peripheral device at an address received on an address bus (by way of a data out bus of the DSOCM controller). Similarly, data read from the peripheral device is received at the DSOCM controller by way of a data bus of the DSOCM controller.

According to one aspect of the present invention, additional signals are coupled between the DSOCM controller and the peripheral device to enable variable latency outputs of data from the peripheral device. Because it is necessary to ensure that the read or write address related to a read or write operation is valid, a Read Address Valid signal and a Write Address Valid signal are provided to the peripheral device, while a Read/Write Complete signal is provided from the peripheral device to the DSOCM controller after a read or write operation has been completed. That is, because data may not be written to or read from the peripheral device in a known number of clock cycles, such as a predetermined number of clock cycles of the processor, it is necessary to receive a Read/Write Complete signal from the peripheral device to be certain that the data was properly written to or read from the peripheral device. The circuits for holding an address or data will be described in more detail in reference to FIG. 6. The timing of the Address Valid signals and Read/Write Complete signals will be described in more detail in reference to FIGS. 7-11.

According to one aspect of the invention, the variable latency transactions enabled by the circuits of an embodiment of the present invention provide a high degree of flexibility and allow data transfers to be completed in variable multiples of peripheral device clock cycles. One significant advantage of the variable latency feature is the flexibility of the end user to use a DSOCM controller based system. For example, it allows a user to tradeoff performance versus area parameters for their system. Considering that a number of predefined functions (such as circuits implemented in configurable logic commonly called "cores" or intellectual property (IP)) with various latencies are often attached to a conventional DSOCM controller operating in a fixed latency mode, the performance of the programmable logic device is dictated by the slowest IP in the system since they all have to run at the same frequency. By enabling variable latency data transfers, the circuits and method of embodiments of the present invention allow IPs to run at their own speed, and such a restriction can be removed. That is, although the IPs operate at the same frequency, the latency of the data written to or read from a peripheral device may vary.

Further, by supporting variable latency data transfers, the DSOCM controller provides the flexibility to attach one or more memory-mapped slave peripherals, such as a BRAM or memory mapped IP core, to the processor. The DSOCM controller of an embodiment of the present invention allows the FPGA fabric to take multiple clocks (e.g. a BRAM data side on-chip memory clock (BRAMDSOCMCLK)) before a load or store operation can be completed, for example. This allows different peripheral devices to respond based on the requirement of the peripheral device and not based on a predefined number of BRAMDSOCMCLK cycles. While both the DSOCM controller and the peripheral devices still run at the BRAMDSOCMCLK frequency, a new read/write completion signal, DSOCMRWCOMPLETE, is driven by the peripheral device to ensure that the appropriate addresses and data are preserved until the data transfer is complete.

Figure 5:
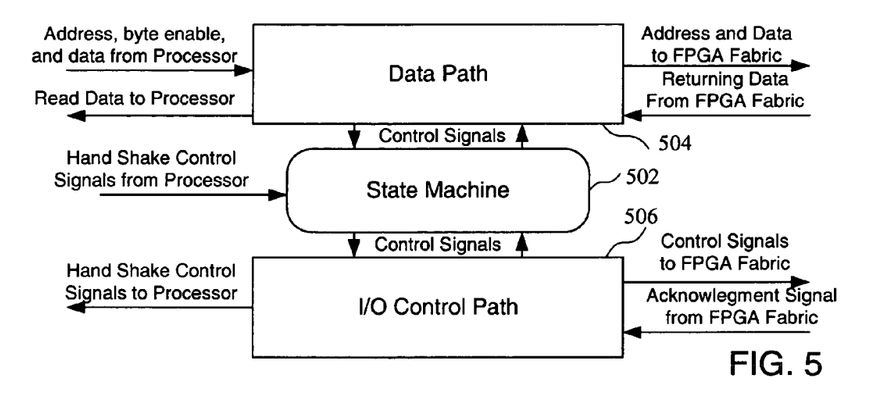
FIG. 5 is a block diagram showing the transfer of signals between a processor and circuits in a programmable logic device according to an embodiment of the present invention.

Turning now to FIG. 5, a block diagram shows the transfer of signals between a processor and circuits in a programmable logic device according to an embodiment of the present invention. As shown in FIG. 5, a state machine 502 couples control signals to and from a data path 504 and an I/O control path 506. The data path also couples signals to and from a processor, as well as to and from circuits of a programmable logic device, such as an FPGA. In particular, the data path 504 receives an address, a byte enable signal, and data from the processor. The data path 504 also provides address and data to circuits of the programmable logic device, and receives data back from the circuits of the programmable logic device. Finally, the path 504 couples data read from a memory of the programmable logic device to the processor. Similarly, the I/O control path also couples signals to the processor, as well as to and from circuits of a programmable logic device. That is, the I/O control path provides control signals to circuits of the programmable logic device, and receives an acknowledge signal. The I/O control path 506 also provides a hand shake control signal to the processor.

Figure 6:
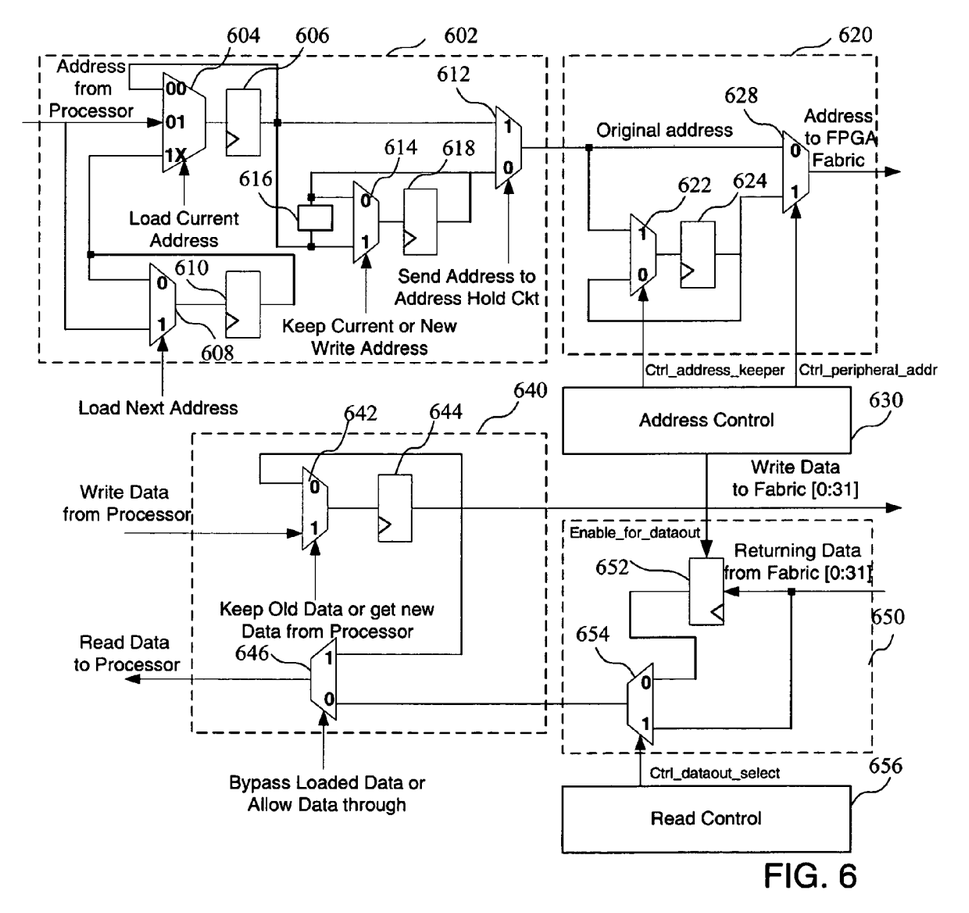
FIG. 6 is a block diagram of a circuit for holding address and data signals to enable variable latency data transfers according to an embodiment of the present invention.

Turning now to FIG. 6, a block diagram of a circuit for holding address and data signals to enable variable latency data transfers according to an embodiment of the present invention is shown. The circuit of FIG. 6 could be implemented in the DSOCM controller 304, for example. In particular, an address select circuit 602 comprises a first multiplexer 604 coupled to receive an address from the processor which is stored in a register 606, the output of which is coupled to an input of the multiplexer 604. A multiplexer 608 is also coupled to receive another address from the processor, and stores the address in a register 610, the output of which is also coupled to another input of multiplexer 604. A load current address signal is coupled to the multiplexer 604 which outputs an appropriate input to the register. A load next address signal is coupled to the multiplexer 608 to latch the address in the register 610 or select a new address from the processor. The output of register 606 is coupled to an input of multiplexer 612 to output an original address or a registered address previously output from register 606. In particular, a multiplexer 614 is coupled to registers 606 and 618. A comparator 616 is used to compare the address output from the register 606 with the address stored in register 618.

Because the embodiments of the present invention enable variable latency data transfers, it may be necessary to hold an address provided to a peripheral device. Accordingly, an address control circuit generates a signal to hold the address to be provided to the peripheral device until an acknowledgement signal is received. In particular, the output of the address select circuit 602 is coupled to an address hold circuit 620. A multiplexer 622 is coupled to receive the address from the address load circuit 602 and an address from a register 624 coupled to the output of the multiplexer 622. The original address output from the address select circuit 602 and the output of the register 624 is coupled to an output address multiplexer 622 to output the appropriate address. An address control circuit 630 generates signal to hold the address to be provided to the peripheral until an acknowledgement signal is received. The address control circuit 630 couples a Ctrl_address_keeper signal to control multiplexer 622 and holds an address latched in register 624, or stores a new address in the register 624. Similarly, a Ctrl_peripheral_address signal is coupled to control multiplexer 628 to output the address from the address select circuit 602 or an address stored in register 624.

The circuit of FIG. 6 also comprises a data input/output circuit 640 adapted to couple data to and receive data from a peripheral device. In particular, a multiplexer 642 receives data from a processor. The output of the processor is coupled to a register 644, the output of which is coupled to a peripheral device. The data input/output circuit 640 also comprises a multiplexer adapted to bypass data loaded to circuit 640, or provide the data to the processor. While it may be necessary to hold an address to enable variable latency data transfers, it may also be necessary to hold data returned from a peripheral device until the processor is ready to receive the data. Accordingly, a data hold circuit 650 is coupled to receive data from a peripheral device. The data hold circuit 650 comprises a register 652 coupled to receive data returning from the peripheral device. The output of register 652 is coupled to a multiplexer 654 which also receives the data returned from the peripheral device. Finally, a read control circuit couples a Ctrl_dataout_select signal to the multiplexer 654 to output the appropriate data from the peripheral device. The timing of signals for writing data to or reading data from a peripheral device will be described in more detail in reference to the timing diagrams of FIGS. 8-11.

Figure 7:
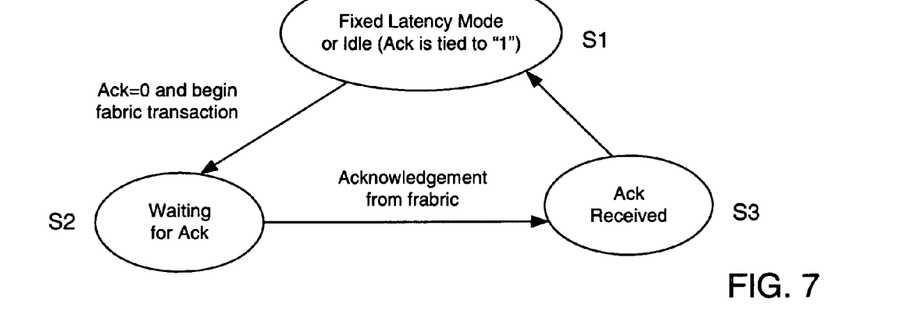
FIG. 7 is a state diagram showing the states of a circuit for enabling variable latency data transfers according to an embodiment of the present invention.

Turning now to FIG. 7, a state diagram shows the states of a circuit for enabling variable latency data transfers according to an embodiment of the present invention. In particular, a circuit in a first state S1 is either in fixed latency mode or is idle (having previously received a valid acknowledge signal). When a request from a processor to load an address is received, and not having received an acknowledge signal for that transaction, a variable latency data transfer with a peripheral device is started. The circuit is then in a second state S2 waiting for an acknowledge signal from the peripheral device. When an acknowledge signal is received, the circuit moves to a third state S3. After the acknowledge signal is received from the peripheral device, the circuit becomes idle and returns to the first state. The timing of the acknowledge signal (i.e. a read or write complete signal) enables the variable latency data transfers, as will be described in more detail below in reference to the timing diagrams of FIGS. 8-11.

Figure 8:
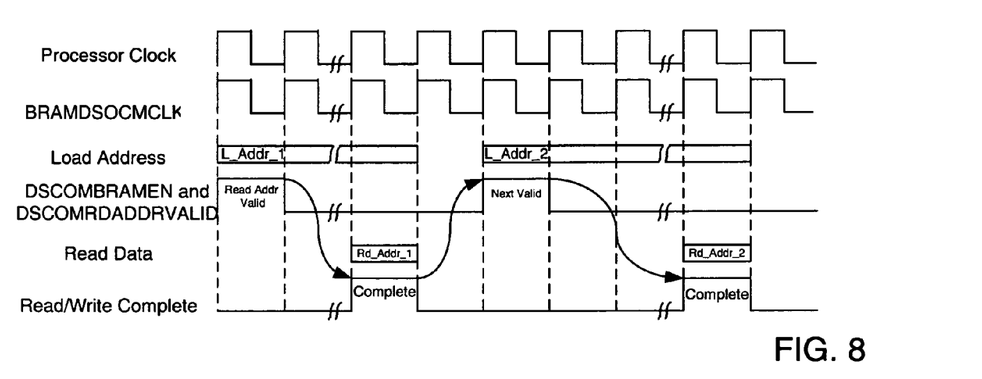
FIG. 8 is a timing diagram showing a single cycle mode, variable latency read operation according to an embodiment of the present invention.
Figure 9:
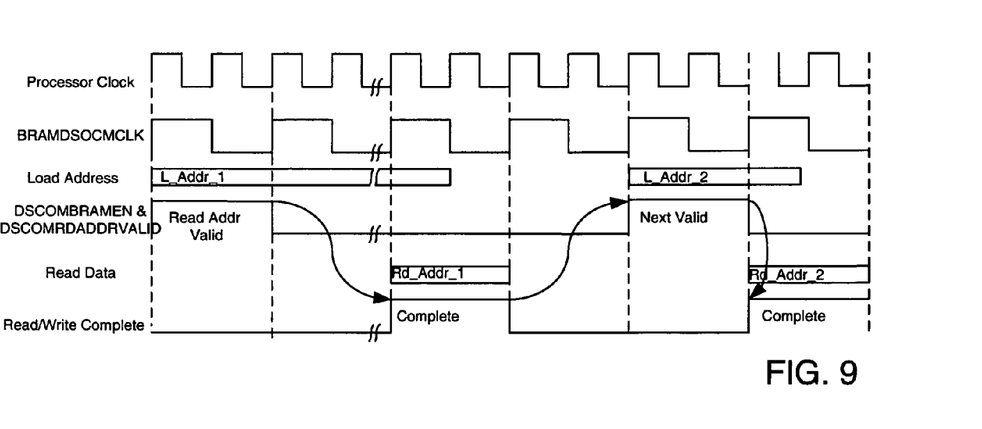
FIG. 9 is a timing diagram showing a multi-cycle mode, variable latency read operation according to an embodiment of the present invention.

Turning now to FIGS. 8 and 9, timing diagrams show single cycle and multi-cycle mode, variable latency read operations according to embodiments of the present invention. In a single cycle mode, a processor clock and a peripheral clock, such as a BRAM data side on-chip memory clock (BRAMDSOCMCLK), have a ratio of 1:1. As will be described in more detail in reference to FIG. 9, the processor clock and a peripheral clock will have ratio of 2:1. While the multi-cycle mode having a ratio of 2:1 is given by way of example, it will be understood that other ratios of the processor clock and peripheral clock could be employed according to the present invention. In reading data, the processor launches a load request to the DSOCM controller, which translates the processor load request, routes the address to the memory, and asserts all of the necessary control signals to load data to the memory. When a valid data side on-chip memory BRAM enable (DSOCMBRAMEN) signal and a data side on-chip memory read address valid (DSOCMRDADDRVALID) signal indicating a valid read address is on the DSOCMRDABUS are received, a first address (L_Addr_1) is loaded. The read control signals, such as a DSOCMBRAMEN signal or a DSOCMRDADDRVALID signal, are active for only one BRAMDSOCMCLK cycle. In order to maintain a valid address according to the timing diagrams of FIGS. 8 and 9, a valid address may be preserved as shown using the circuit of FIG. 6, for example. Accordingly, the peripheral device waits for multiple BRAMDSOCMCLK cycles before returning data, where the number of clock cycles depends on the peripheral device.

The peripheral device then asserts a data side on-chip memory read write complete (DSOCMRWCOMPLETE) signal, which must be accompanied by valid read data. When the DSOCM controller receives the DSOCMRWCOMPLETE signal, it latches the read data driven by the peripheral and forwards the data to the processor. As can be seen in the timing diagram of FIG. 8, the number of cycles required to read data varies for different data read operations. That is, the number or read cycles required for reading data from Addr_1 may be different than the number of read cycles for reading data from Addr_2. However, because a Read/Write Complete signal is only returned after a read operation is complete, the required addresses and enable signals will be registered to ensure that the proper data is read.

As shown in the timing diagram of FIG. 9, a multi-cycle cycle mode, variable latency read operation is performed based upon a peripheral clock where the ratio of the processor clock and the peripheral clock is 2:1. As can also be seen in FIG. 9, the valid data which is read and the Read/Write Complete signal are also provided after a variable number of peripheral clock cycles for the first read operation and the second read operation. The amount of time associated with the first data transfer and the second data transfer could depend upon different functions of a single peripheral device, such as a BRAM, or separate peripheral devices.

Figure 10:
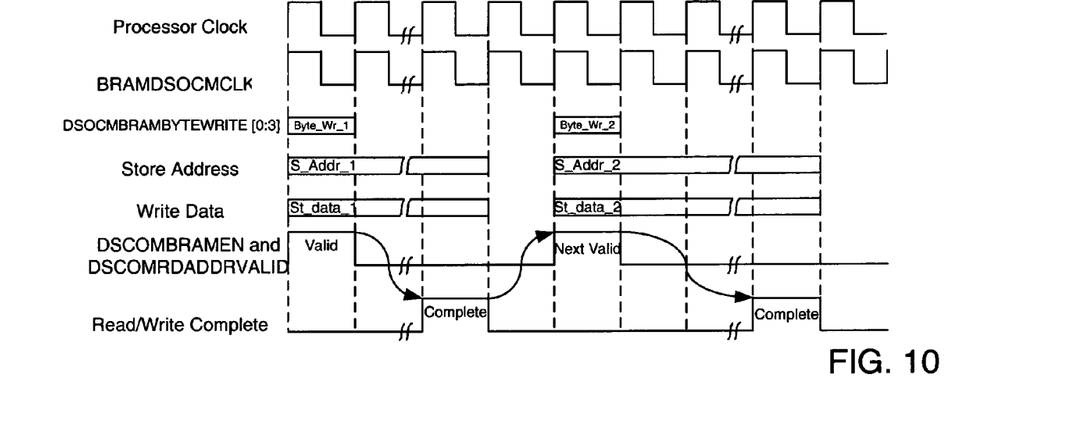
FIG. 10 is a timing diagram showing a single cycle mode, variable latency write operation according to an embodiment of the present invention.
Figure 11:
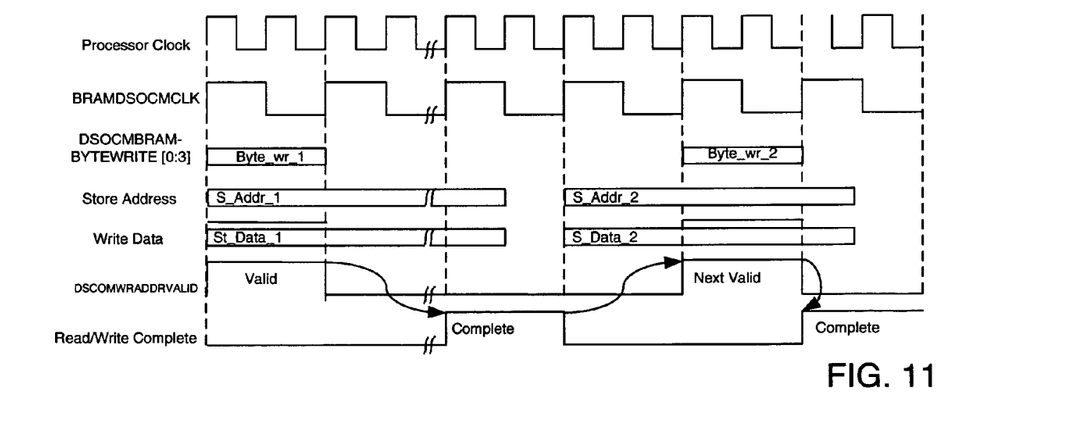
FIG. 11 is a timing diagram showing a multi-cycle mode, variable latency write operation according to an embodiment of the present invention.

Turning now to FIGS. 10 and 11, timing diagrams show single mode, variable latency write operations according to embodiments of the present invention. FIGS. 10 and 11 show two store operations with variable latency for single cycle mode and for multi-cycle mode (where a processor clock: peripheral clock ratio is 2:1). The processor launches a store request to the DSOCM controller. The DSOCM controller translates the processor order, routes address and write data, and asserts all of the necessary output control signals to perform the write operation. Write control signals (such as a data side on-chip memory write address valid signal (DSOCMWRADDRVALID) signal, a data side on-chip memory BRAM enable (DSOCMBRAMEN) signal, and a data side on-chip memory BRAM byte write (DSOCMBRAMBYTEWRITE) signal) are active for only one BRAMDSOCMCLK cycle. Various write signals must also be registered, as described for example in reference to FIG. 6. For example, when a valid DSOCMBRAMBYTEWRITE indicates a valid write address and write data is on the DSOCMWRABUS, the address and data to be written to the BRAM must be maintained until a Read/Write Complete signal is received. According to an embodiment of the present invention, the peripheral waits for multiple BRAMDSOCMCLK cycles (where the number of clock cycles depends on the application of the peripheral) and then asserts Read/Write Complete signal, which signifies a completion of write data store. When the DSOCM controller sees the Read/Write Complete signal, the internal state machine of the device is allowed to move forward for the next request on the DSOCM bus. As shown in the timing diagram of FIG. 11, a multi-cycle mode, variable latency write operation is performed according to an embodiment of the present invention. While reference is made to BRAM signals for reading data from or writing data to a BRAM device, these signals are only given by way of example, and the timing signals could apply generally to any peripheral device to enable a variable latency data transfer with a peripheral device other than a memory.

Figure 12:
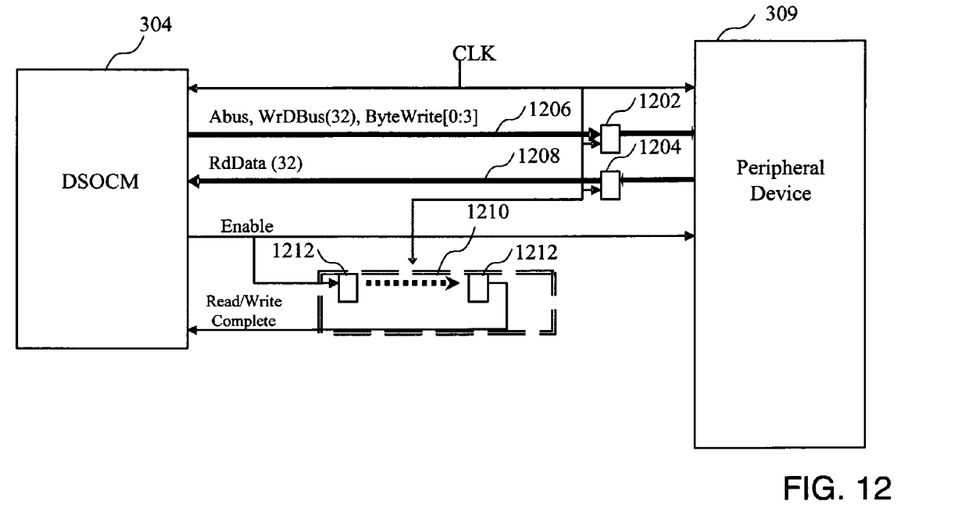
FIG. 12 is a circuit diagram showing pipelining between a DSOCM controller and a peripheral device according to an embodiment of the present invention.

Turning now to FIG. 12, a circuit diagram shows pipelining between a DSOCM controller and a peripheral device according to an embodiment of the present invention. Pipelining, as is well known in the art, enables increasing the operating frequency of the circuit. Accordingly, adding flip flops can increase the frequency of the circuit to offset an increase in latency of the circuit. In particular, flip flops 1202 and flip flops 1204 are provided in the control signal path 1206 and the data path 1208, respectively to increase the operating speed of the circuit. Similarly, an enable signal is coupled to a circuit 1210 having a plurality of flip flops 1212 and generating a Read/Write Complete signal. Instead of adding control logic to generate Read/Write Complete signal, an appropriate number of flip flops can be added to generate the Read/Write Complete signal at the appropriate time.

To provide an example of the performance improvement of the circuit of FIG. 12, consider a large number of BRAMs attached to the DSOCM controller in a conventional fixed latency implementation. Assuming that the most critical path in terms of performance of the circuit exists on the address path from the DSOCM controller to the BRAMs operating at 66 MHz, it takes 2 BRAM clock cycles to complete a transaction in fixed latency mode. Hence, the overall system performance is at 1.056 Gbps (32 bits at 66 MHz/2 clock cycles). The performance of this path can be further improved by adding pipeline stages between the DSOCM controller and BRAMS. In the example of the FIG. 12, a new improved frequency of 120 MHz occurs. That is, the variable latency feature of an embodiment of the present invention, which allows for the addition of such a pipeline stage, results in 3 BRAM clock cycles to complete a transaction. Accordingly, the overall system performance is improved to 1.28 Gbps (32 bits at 120 MHz/3 clock cycles), or a 21% overall improvement in the performance of the system.

Figure 13:
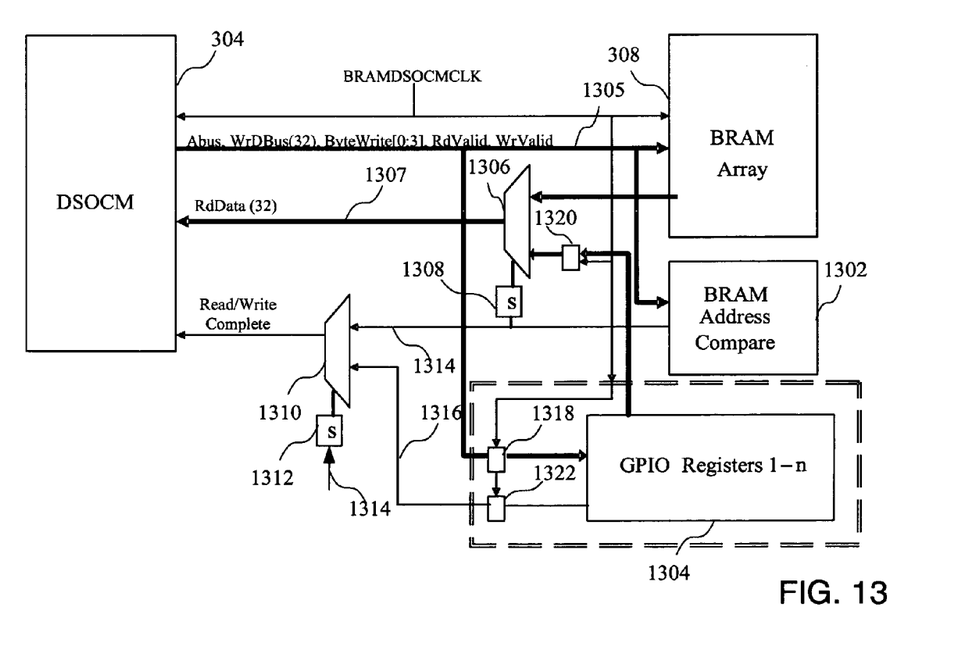
FIG. 13 is a circuit diagram showing a DSOCM controller interfacing with a BRAM and a memory mapped peripheral according to an embodiment of the present invention.

Turning now to FIG. 13, a circuit diagram shows a DSOCM controller interfacing with a BRAM and a memory mapped peripheral according to an embodiment of the present invention. In particular, the DSOCM controller 304 couples a read address, for example, to the BRAM 308, a BRAM address compare circuit 1302, and general purpose I/O (GPIO) registers 1304 by way of an address bus 1305. The BRAM address compare circuit 1302 determines whether the data is to be read from the BRAM 308 or the GPIO registers 1304. Accordingly, the data outputs of the BRAM 308 and the GPIO registers 1304 are coupled to a multiplexer 1306 which generates output data on a data bus 1307 coupled to the DSOCM controller 304. The input of the multiplexer 1306 is selected by an input from selector 1308 which receives a selection signal from the BRAM address compare circuit 1302. The selection signal, which is coupled to a multiplexer 1310, is also coupled to a selector 1312 to select a Read/Write Complete signal from the BRAM address compare circuit 1302 on a Read/Write Complete signal line 1314 or the GPIO registers 1304 on a Read/Write Complete signal line 1316. That is, the Read/Write Complete signal is selected from an output of the BRAM address compare circuit or the GPIO registers depending upon whether the data is output from the BRAM or the GPIO registers. Pipelining is also preferably employed in the circuit to improve the operating speed of the circuit and provide the required timing for the outputs of the various elements of the circuits. In particular, a flip flop 1318 is included in the data input path to the GPIO registers 1304. Similarly, a flip flop 1320 is included in the output data path of the GPIO registers 1304, while a flip flop 1322 is included in the output signal path to the multiplexer 1310 for outputting a Read/Write Complete signal.

Figure 14:
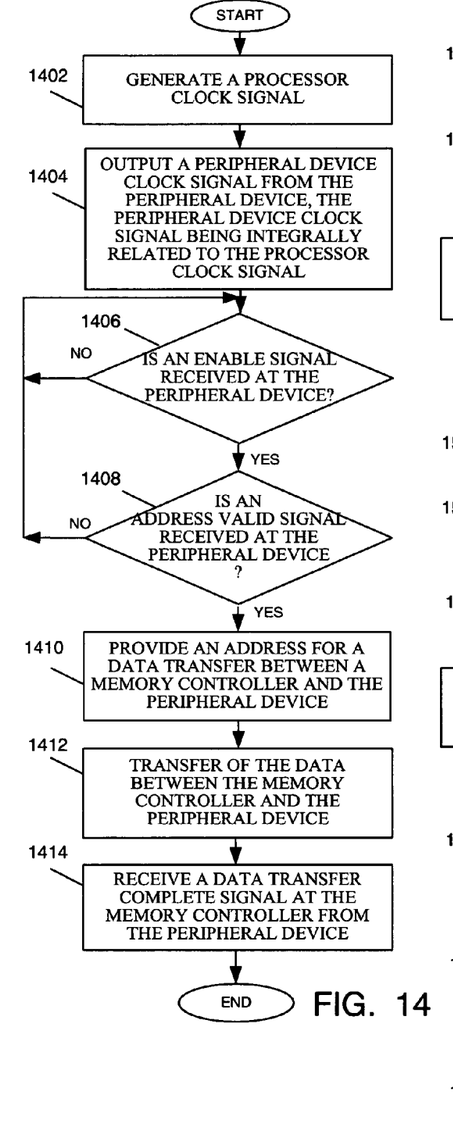
FIG. 14 is a flow chart showing a method of enabling variable latency data transfers in a peripheral device according to an embodiment of the present invention.

Turning now to FIG. 14, a flow chart shows a method of enabling variable latency data transfers in a memory device according to an embodiment of the present invention. The method of FIG. 14, as well and the methods of FIGS. 14-17 described below, can be implemented using any of the circuits and/or timing diagrams described with respect to FIGS. 2-13, or any other suitable circuit. In particular, according to one aspect of the present invention, a processor clock signal is generated at a step 1402. A peripheral device clock signal associated with the peripheral device is output at a step 1404. The processor clock signal and the peripheral device clock signal are preferably defined by a predetermined N:1 integral ratio. It is then determined whether an enable signal is received at the peripheral device at a step 1406. If so, it is determined whether an address valid signal is received at the peripheral device at a step 1408. Assuming an enable signal and an address valid signal are received, an address for a data transfer between a memory controller and the peripheral device is provided at a step 1410. Data is transferred between the memory controller and the peripheral device at a step 1412. A data transfer complete signal is then received at the memory controller from the peripheral device at a step 1414. Although the various steps are shown in a given order, it will be understood that the distinct steps of FIG. 14 (or the steps of FIGS. 15-17) shown separately could be performed simultaneously or in a different order than shown.

Figure 15:
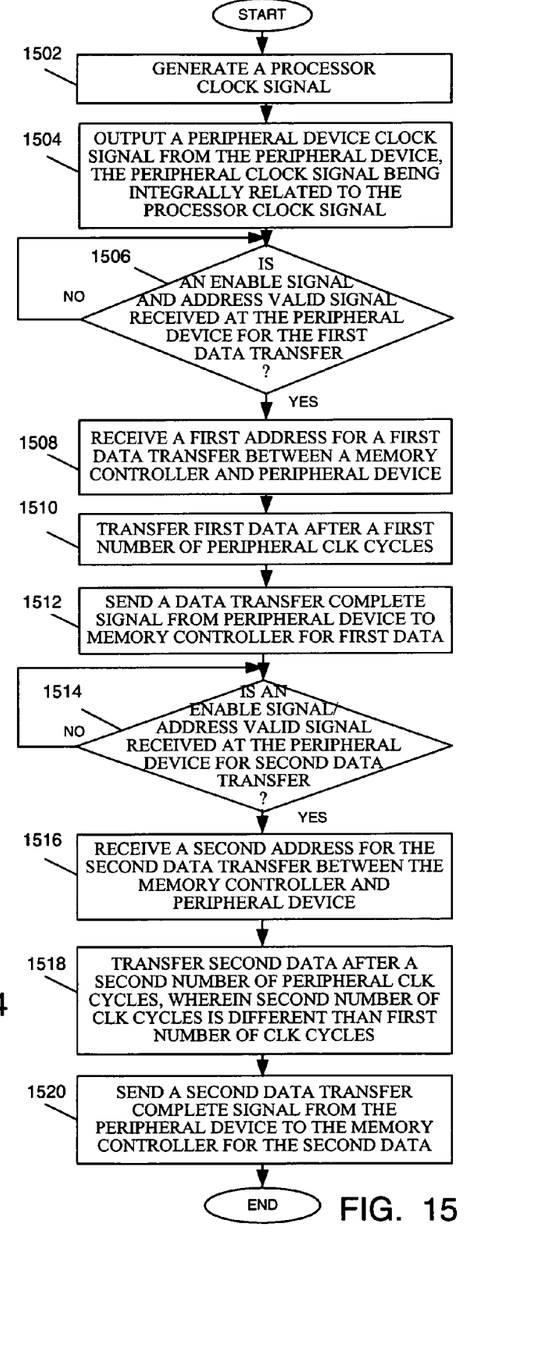
FIG. 15 is a flow chart showing a method enabling variable latency data transfers based upon peripheral devices operating at different rates according to an embodiment of the present invention.

Turning now to FIG. 15, a flow chart shows a method of enabling variable latency data transfers based upon function of peripheral devices attached to a DSOCM controllers according to an embodiment of the present invention. In particular, a processor clock signal is generated at a step 1502. A peripheral device clock signal associated with the peripheral device is also output at a step 1504, wherein the processor clock signal and the peripheral clock signal are preferably defined by a predetermined N:1 integral ratio. It is then determined whether an enable signal and address valid signal are received at the peripheral device for the first data transfer at a step 1506. If so, a first address for a first data transfer between a memory controller and the peripheral device is received at a step 1508. The first data is transferred after a first number of peripheral device clock cycles at a step 1510. A data transfer complete signal is then sent from the peripheral device to the memory controller for the first data at a step 1512. It is then determined whether a memory enable signal and address valid signal are received at the peripheral device for the second data transfer at a step 1514. If so, a second address for a second data transfer between the memory controller and the peripheral device is received at a step 1516. The second data is transferred after a second number of peripheral clock cycles at a step 1518, wherein the second number of clock cycles is different than the first number of clock cycles. Finally, a second data transfer complete signal is sent from the peripheral device to the memory controller for the second data at a step 1520.

Figure 16:
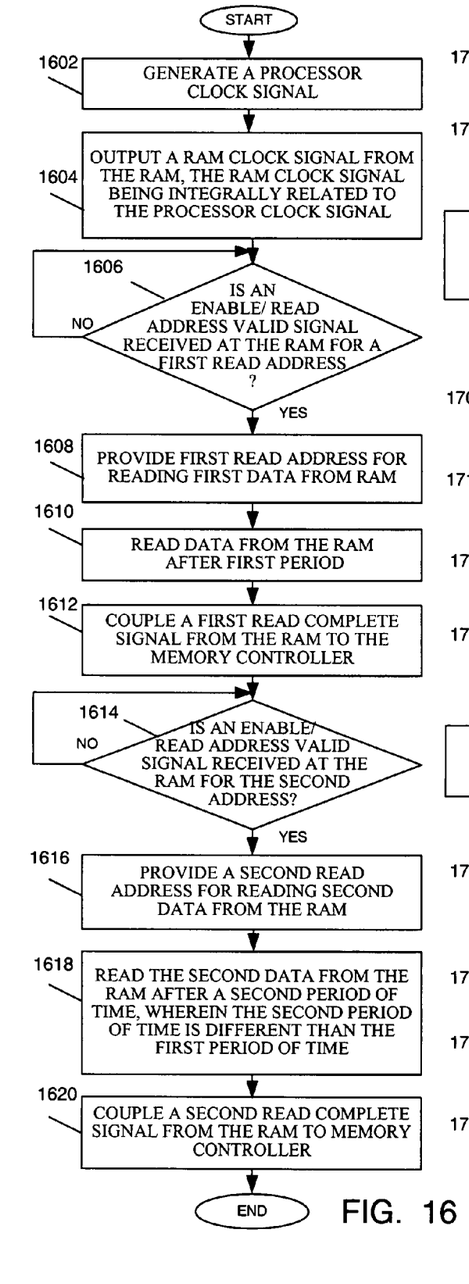
FIG. 16 is a flow chart showing a method enabling variable latency data reading of data stored in a memory device according to an embodiment of the present invention.

Turning now to FIG. 16, a flow chart shows a method of enabling variable latency data reading of data stored in a memory device according to an embodiment of the present invention. In particular, a processor clock signal is generated at a step 1602. A RAM clock signal associated with the random access memory is generated at a step 1604, wherein the RAM clock signal is a multiple of the processor clock signal. It is then determined whether an enable/read address valid signals are received at the RAM for the first read address at a step 1606. If so, a first read address is provided for reading first data from the random access memory at a step 1608. Data is read from the random access memory after a first period of time at a step 1610. A first read complete signal is then coupled from the random access memory to the memory controller at a step 1612. It is then determined whether an enable/read address valid signals are received at the RAM for the second address at a step 1614. If so, a second read address is also provided for reading second data from the random access memory at a step 1616. The second data is read from the random access memory after a second period of time at a step 1618, wherein the second period of time is different than the first period of time. Finally, a second read complete signal is coupled from the random access memory to the memory controller at a step 1620.

Figure 17:
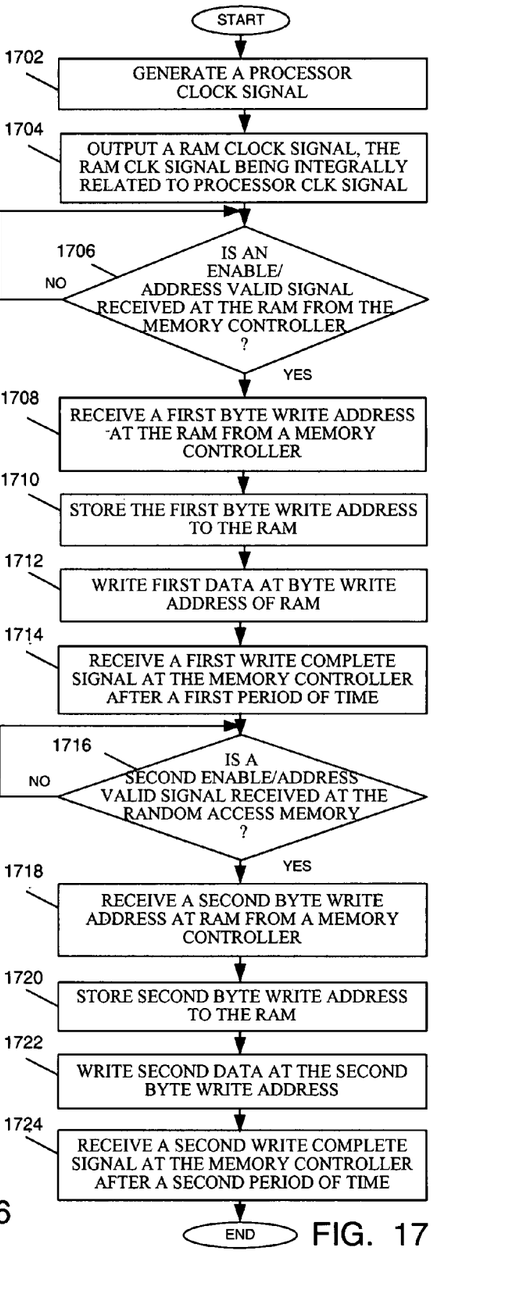
FIG. 17 is a flow chart showing a method enabling variable latency data writing to a memory device according to an embodiment of the present invention.

Turning to FIG. 17, a flow chart shows a method of enabling variable latency data writing to a memory device according to an embodiment of the present invention. A processor clock signal is generated at a step 1702. A RAM clock signal associated with the random access memory is generated at a step 1704, wherein the RAM clock signal is a multiple of the processor clock signal. It is then determined whether an address valid signal is received at the random access memory from the memory controller at a step 1706. If so, a first write address is received at the random access memory from a memory controller at a step 1708. The first write address stored at the random access memory at a step 1710. First data is then written at the write address of the random access memory at a step 1712. A first write complete signal is received at the memory controller from the random access memory after a first period of time at a step 1714. It is then determined whether a second address valid signal is received at the random access memory from the memory controller at a step 1716. If so, a second write address is then received at the random access memory from a memory controller at a step 1718. The second write address is stored at the random access memory at a step 1720. A second data is written at the second write address of the random access memory at a step 1722. Finally, a second write complete signal is received at the memory controller from the random access memory after a second period of time, wherein the second period of time is different than the first period of time at a step 1724.

Figure 18:
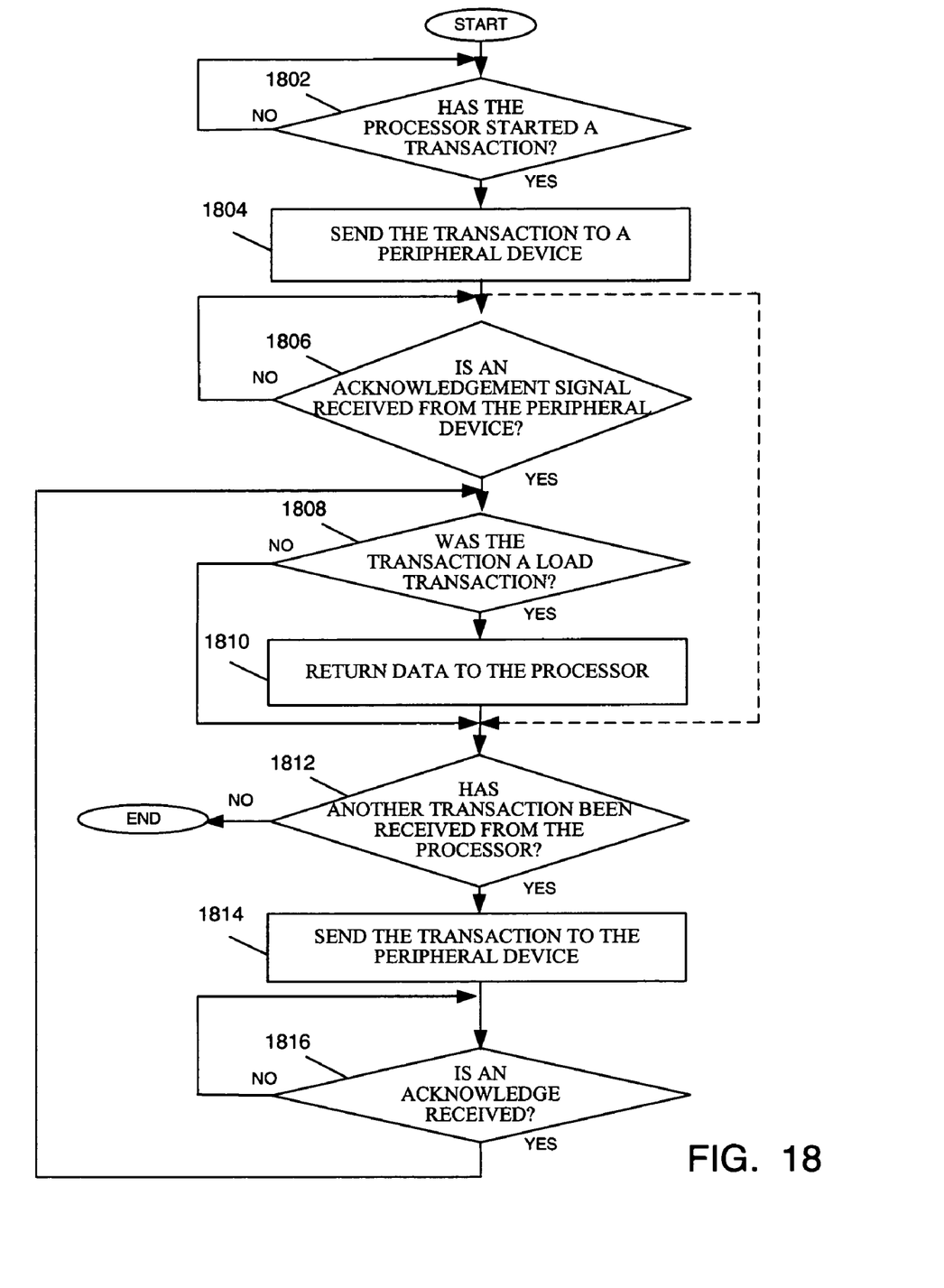
FIG. 18 is a flow chart showing a method enabling two or more transaction on a DSOCM controller according to an embodiment of the present invention.

Finally, turning to FIG. 18, a flow chart shows a method enabling variable latency data writing to a memory device according to an embodiment of the present invention. In particular, it is determined whether a processor has started a transaction at a step 1802. If so, the transaction is sent to a peripheral device at a step 1804. It is then determined whether an acknowledgement signal is received from the peripheral device at a step 1806. If so, it is determined whether a transaction is a load transaction at a step 1808. If so, data is returned to the processor at step 1810. It is then determined whether another transaction has been received from the processor at a step 1812. If so, the transaction is sent to the peripheral device at a step 1814. As shown by the dashed line, another transaction can be received by the processor while a transaction at the peripheral is outstanding. Finally, it is determined whether an acknowledgment is received at a step 1816. When an acknowledgement is received, it is determined whether another transaction is loaded at a step 1808

It can therefore be appreciated that the new and novel circuits for and methods of enabling variable latency data transfers have been described. It will be appreciated by those skilled in the art that, particular to the teaching herein, numerous alternatives and equivalents will be seen to exist which incorporate the disclosed invention. As a result, the invention is not to be limited by the foregoing embodiments, but only by the following claims.

The invention claimed is:

1. A method of enabling variable latency data transfers in an integrated circuit having a plurality of peripheral devices transmitting data within said integrated circuit, said method comprising the steps of:
   coupling a memory controller between a processor of said integrated circuit and a peripheral device, said memory controller controlling the transfer of data to and from said processor;
   providing said peripheral device implementing a function in a configurable resource of said integrated circuit;
   providing an address for a data transfer between said memory controller and said peripheral device;
   coupling an address valid signal to said peripheral device;
   transferring said data between said processor and said peripheral device by way of said memory controller during a single clock cycle of said peripheral device after a latency period which is unknown to said processor, said latency period comprising a number of clock cycles of a clock driving said peripheral device based upon a requirement of said function implemented in said peripheral device;
   generating, by said peripheral device, a data transfer complete signal associated with the completion of the step of transferring said data between said processor and said peripheral device by way of said memory controller, wherein said data transfer complete signal defines said latency period; and
   receiving said data transfer complete signal at said memory controller from said peripheral device after said latency period based upon said requirement of said function implemented in said configurable resource of said peripheral device, wherein said data transferred between said processor and said peripheral device is available at said memory controller during a read and at said peripheral device during a write during the same clock cycle that said data transfer complete signal is received by said memory controller.

2. The method of claim 1 wherein said step of transferring said data comprises a step of reading data from a memory.

3. The method of claim 1 wherein said step of transferring said data comprises a step of writing data to a memory.

4. The method of claim 1 wherein said step of transferring said data comprises a step of transferring a first set of data after a first period of time, said first period of time comprising a multiple of a clock associated with a processor coupled to said peripheral device.

5. The method of claim 4 further comprising a step of transferring a second set of data after a second period of time, said second period of time comprising a second multiple of said clock associated with a processor coupled to said peripheral device.

6. A method of enabling variable latency data transfers in an integrated circuit having a plurality of peripheral devices transmitting data within said integrated circuit, said method comprising the steps of:
   coupling a memory controller between a processor of said integrated circuit having a programmable resource and a peripheral device, said memory controller controlling the transfer of data to and from said processor;

implementing a first function in said programmable resource of said peripheral device;

receiving a first address for a first data transfer between said processor and said peripheral device by way of said memory controller;

transferring data for said first data transfer during a single clock cycle of said peripheral device after a first latency period which is unknown to said processor, said first latency period comprising a first number of clock cycles of a clock driving said peripheral device, wherein said first number of clock cycles is determined by said first function implemented by said peripheral device;

generating, by said peripheral device, a first data transfer complete signal associated with the completion of the step of transferring said data for said first data transfer after said first latency period, wherein said first data transfer complete signal defines said first latency period, wherein said data for said first data transfer is available at said memory controller during a read and at said peripheral device during a write during the same clock cycle that said first data transfer complete signal is received by said memory controller;

receiving a second address for a second data transfer between said memory controller and said peripheral device;

transferring data for said second data transfer during a single clock cycle of said peripheral device after a second latency period comprising a second number of clock cycles of said clock driving said peripheral device, wherein said second number of clock cycles is different than said first number of clock cycles;

generating, by said peripheral device, a second data transfer complete signal associated with the completion of the step of transferring said data for said second data transfer after said second latency period, wherein said second data transfer complete signal defines said second latency period; and receiving said second data transfer complete signal at said memory controller from said peripheral device based upon a requirement of said first function implemented in said peripheral device, wherein said data for said second data transfer is available at said memory controller during a read and at said peripheral device during a write during the same clock cycle that said second data transfer complete signal is received by said memory controller.

7. The method of claim 6 wherein said second number of clock cycles is determined by a second function of said peripheral device.

8. The method of claim 6 wherein said second number of clock cycles is determined by a function of a second peripheral device.

9. The method of claim 6 further comprising a step of receiving a peripheral device enable signal and an address valid signal at said peripheral device from said memory controller.

10. A method of enabling variable latency data transfers in an integrated circuit having a plurality of peripheral devices transmitting data within said integrated circuit, said method comprising the steps of:

providing a processor of said integrated circuit communicating with said plurality of peripheral devices of said integrated circuit, said processor operating at a first frequency according to a first clock signal;

coupling a memory controller of said integrated circuit to said processor, said memory controller controlling the transfer of data to and from said processor;

enabling communication by way of programmable interconnect elements with a memory implemented as a peripheral device which is operated at a second frequency according to a second clock signal;

coupling an address from said memory controller to said memory;

receiving a read address valid signal at said memory from said memory controller;

reading data from said memory during a single clock cycle of said peripheral device after a variable latency period which is unknown to said processor, said variable latency period comprising a number of clock cycles of said second clock signal;

generating, by said peripheral device, a read complete signal associated with the completion of the step of reading said data from said memory after said variable latency period, wherein said read complete signal defines said variable latency period; and receiving a read complete signal at said memory controller from said memory after said variable latency period, wherein said data read from said memory is available at said memory controller during the same clock cycle that said read complete signal is received by said memory controller.

11. The method of claim 10 further comprising a step of receiving a read address valid signal for a second address at said memory from said memory controller.

12. The method of claim 11 further comprising a step of coupling said second address from said memory controller to said memory.

13. The method of claim 12 further comprising a step of receiving a second read complete signal at said memory controller from said memory after reading data from said second address of said memory.

14. A method of enabling variable latency data transfers in an integrated circuit having a plurality of peripheral devices transmitting data within said integrated circuit, said method comprising the steps of:

providing a processor of said integrated circuit communicating with said plurality of peripheral devices, said processor operating at a first frequency according to a first clock signal;

coupling a memory controller of said integrated circuit to said processor, said memory controller controlling the transfer of data to and from said processor;

enabling communication by way of programmable interconnect elements with a memory implemented as a peripheral device which is operated at a second frequency according to a second clock signal;

receiving a write address at said memory from said memory controller;

receiving an address valid signal at said memory from said memory controller;

storing said write address to said memory;

writing data from said processor to said write address during a single clock cycle of said peripheral device;

generating, by said peripheral device, a write complete signal associated with the completion of the step of writing data from said processor to said write address, wherein said write complete signal defines a variable latency period for writing said data; and receiving said write complete signal at said memory controller from said memory after said variable latency period which is unknown to said processor, said variable latency period comprising a number of clock cycles of a clock driving said memory, wherein said data written to said memory is available at said memory during the same clock cycle that said write complete signal is received by said memory controller.

15. The method of claim 14 further comprising a step of receiving a second address valid signal for a second write address from said memory controller.

16. The method of claim 15 further comprising a step of writing data to said second write address.

17. The method of claim 16 further comprising a step of receiving a second write complete signal at said memory controller from said memory after said step of writing data at said second write address is complete.

18. An integrated circuit enabling a variable latency data transfer, said integrated circuit comprising:
a processor;
a peripheral device implementing a function in a configurable logic resource coupled to receive data from and provide data to said processor;
a memory controller coupled between said processor and said peripheral device, said memory controller enabling a variable latency data transfer during a single clock cycle of said peripheral device by transferring data of an address after a variable latency period which is unknown to said processor, said variable latency period comprising a number of clock cycles of a clock driving said peripheral device based upon a requirement of said function implemented in said peripheral device;
an address valid signal coupled from said memory controller to said peripheral device; and
a transfer complete signal generated by said peripheral device and coupled from said peripheral device to said memory controller after said variable latency period based upon said requirement of said function implemented in said configurable resource of said peripheral device, wherein said transfer complete signal is associated with the completion of transferring data between said processor and said peripheral device by way of said memory controller and defines said variable latency period, wherein said data transferred between said processor and said peripheral device is available at said memory controller during a read and at said peripheral device during a write during the same clock cycle that said transfer complete signal is received by said memory controller.

19. The integrated circuit of claim 18 wherein said transfer complete signal comprises a read complete signal from a random access memory.

20. The integrated circuit of claim 18 wherein said transfer complete signal comprises a write complete signal from a random access memory.

21. The integrated circuit of claim 18 further comprising a peripheral clock signal coupled from said peripheral device to said memory controller.

22. The integrated circuit of claim 21 further comprising a processor clock signal coupled from said memory controller to said peripheral device, said processor clock signal being a multiple of said peripheral clock signal.

23. An integrated circuit enabling a variable latency data transfer, said integrated circuit comprising:
a processor;
an address select circuit of a memory controller coupled to said processor, said address select circuit comprising a multiplexer for selecting an address location received from said processor;
an address hold circuit of said memory controller coupled to the output of said address select circuit, said address hold circuit comprising a register for holding a selected address during a variable latency period until a data transfer complete signal is received, wherein said variable latency period is unknown to said processor; and
a peripheral device coupled to said processor by way of said memory controller for transferring data of said selected address between said processor and said peripheral device after said variable latency period comprising a number of clock cycles of a clock driving said peripheral device during a single clock cycle of said peripheral device, said peripheral device being implemented in a configurable resource and coupled to said address hold circuit of said memory controller, said peripheral device outputting said data transfer complete signal based upon a requirement of a function implemented in said configurable resource of said peripheral device, wherein said data transfer complete signal is associated with the completion of transferring said data of said selected address between said processor and said peripheral device and defines said variable latency period, wherein said data transferred between said processor and said peripheral device is available at said memory controller during a read and at said peripheral device during a write during the same clock cycle that said data transfer complete signal is received by said memory controller.

24. The integrated circuit of claim 23 wherein said address hold circuit comprises a first multiplexer coupled to the output of said address select circuit and said register.

25. The integrated circuit of claim 24 further comprising an address hold signal coupled to control the output of said first multiplexer.

26. The integrated circuit of claim 24 wherein said address hold circuit comprises a second multiplexer coupled to the output of said address select circuit and said register.

27. The integrated circuit of claim 26 further comprising an output control signal coupled to control the output of said second multiplexer.

28. An integrated circuit enabling a variable latency data transfer, said integrated circuit comprising:
a processor;
a memory controller coupled to said processor;
a peripheral device implementing a function in a configurable logic resource and coupled to receive a read address from said processor by way of said memory controller;
an output coupled to said peripheral device, said output providing data associated with said read address from said peripheral device after a variable latency period comprising a number of clock cycles of a clock driving said peripheral device during a single clock cycle of said peripheral device, wherein said variable latency period is unknown to said processor; and
a data hold circuit coupled to said output, said data hold circuit comprising a register for holding said data associated with said read address to be transferred to said processor until a data transfer complete signal is received after said variable latency period based upon a requirement of said function implemented in said configurable resource of said peripheral device, wherein said data transfer complete signal is associated with the completion of transferring said data associated with said read address from said peripheral device and defines said variable latency period, wherein said data transferred from said peripheral device is available at said memory controller during the same clock cycle that said data transfer complete signal is received by said memory controller.

29. The integrated circuit of claim 28 wherein said data hold circuit comprises a multiplexer coupled to the output of said register, said multiplexer enabling the selection of data stored in said register or data output by said peripheral device.

30. The integrated circuit of claim 29 wherein said data hold circuit comprises a first control signal coupled to said register to enable latching of data from said peripheral device.

31. The integrated circuit of claim 30 wherein said data hold circuit comprises a second control signal coupled to said multiplexer to enable the output of said data stored in said register.

32. The integrated circuit of claim 30, wherein said integrated circuit is a programmable logic device.

33. An integrated circuit enabling a variable latency data transfer, said integrated circuit comprising:
   processor means;
   configurable resource means for implementing a function;
   address select means of a memory controller coupled to said processor means, said address select means selecting an address location received from said processor means;
   address hold means of said memory controller coupled to the output of said address select means, said address hold means holding a selected address during a variable latency period comprising a number of clock cycles of a clock driving said configurable resource means until a data transfer complete signal is received based upon a requirement of said function implemented in said configurable resource means, wherein said variable latency period is unknown to said processor means;
   memory means coupled to said address hold means, said memory means outputting data after said variable latency period during a single clock cycle of said configurable resource means, wherein said data transfer complete signal is associated with the completion of outputting said data after said variable latency period and defines said variable latency period and said data transferred between said processor means and said configurable resource means is available at said memory controller during the same clock cycle that said data transfer complete signal is received by said memory controller; and
   data hold means of said memory controller coupled to an output of said memory means, said data hold means holding said data to be transferred to said processor means after said variable latency period.

* * * * *

UNITED STATES PATENT AND TRADEMARK OFFICE
CERTIFICATE OF CORRECTION

PATENT NO. : 7,624,209 B1
APPLICATION NO. : 10/941240
DATED : November 24, 2009
INVENTOR(S) : Ansari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twenty-sixth Day of October, 2010

David J. Kappos
*Director of the United States Patent and Trademark Office*